Figure 1:
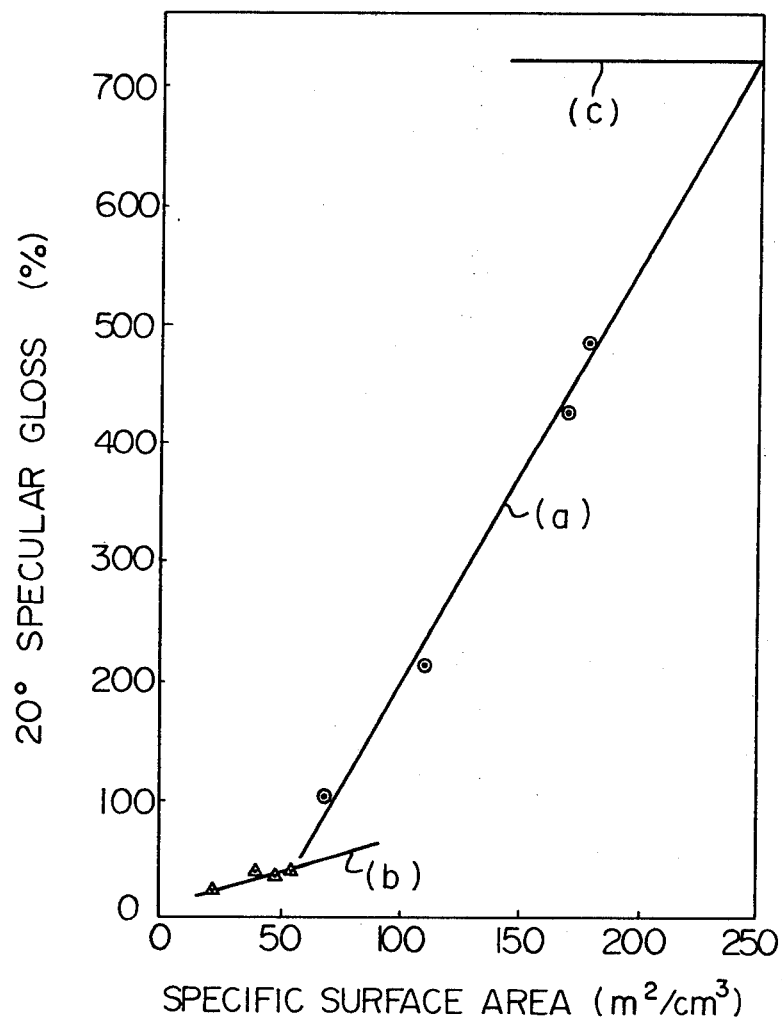

United States Patent [19]

Ishijima et al.

[11] 4,318,747
[45] Mar. 9, 1982

[54] METAL FLAKE PIGMENT AND METHOD OF PREPARING THE SAME

[75] Inventors: Shizuo Ishijima, Mishima; Yasunobu Imasato, Fuji, both of Japan

[73] Assignee: Asahi Kasei Kogyo Kabushiki Kaisha, Osaka, Japan

[21] Appl. No.: 157,237

[22] Filed: Jun. 6, 1980

[30] Foreign Application Priority Data

Jun. 8, 1979 [JP] Japan ................... 54/71194

[51] Int. Cl.³ .................. B02C 15/00; C09C 1/62
[52] U.S. Cl. ................. 106/290; 106/308 F; 106/308 N; 106/309; 241/15; 241/16; 241/22
[58] Field of Search ............... 241/15, 16, 22; 106/309, 290, 308 F

[56] References Cited

U.S. PATENT DOCUMENTS

| | | | |
|---|---|---|---|
| 3,389,105 | 6/1968 | Bolger | 106/290 X |
| 3,776,473 | 12/1973 | Casey et al. | 241/15 |
| 3,941,584 | 3/1976 | Tundermann et al. | 106/290 X |
| 4,065,060 | 12/1977 | Booz | 241/16 |
| 4,116,710 | 9/1978 | Heikel | 106/290 |
| 4,221,593 | 9/1980 | Kubo | 106/290 X |
| 4,236,934 | 12/1980 | Bell | 106/290 |
| 4,264,654 | 4/1981 | Okazaki | 106/290 X |

FOREIGN PATENT DOCUMENTS 870783  6/1961  United Kingdom ........... 106/290

OTHER PUBLICATIONS

Gardam, G. E. et al., "Properties and Use of Aluminum Paste Pigment in Organic Finishes"–Trans. of Inst. of Metal Finishing, vol. 37, 1960, pp. 52–55.

Primary Examiner—Helen M. McCarthy
Attorney, Agent, or Firm—Finnegan, Henderson, Farabow, Garrett & Dunner

[57] ABSTRACT

Novel metal flake pigments suitable for use in coating compositions, which have a good filtration property and good dispersion stability, and which produce coatings having good specular gloss, sharpness of image and hiding power, are presented. These metal flake powders contain metal flakes, between which no substantial aggregation is formed and which have a specific surface area, determined by a BET method, of 65 through 250 m²/cm³, and have such a particle size distribution that at least 99.5% of the flakes pass through a screen having an opening size of 20 microns and at least 90% of the flakes pass through a screen having an opening size of 5 microns. These metal flakes are produced by wet milling small metal pieces or particulates in the presence of a milling aid, including higher fatty acids and the derivatives thereof, in an amount sufficient to cover the surfaces of the metal flakes in a bi-molecule layer.

6 Claims, 1 Drawing Figure

METAL FLAKE PIGMENT AND METHOD OF PREPARING THE SAME

The present invention relates to a novel metal flake powder and the production method thereof. More specifically, it relates to novel metal flake powders suitable for use in coating compositions, which have a good filtration property and good dispersion stability, and which produce coatings having good specular gloss, sharpness of image and hiding power.

Metal flake pigments are widely used, together with compatible vehicles or carriers, for the production of coating compositions, such as, for example, inks, paints and the like. Metal flake pigments are also used for the production of coating compositions which produce protective or decorative coatings. In these cases, metal flake pigments are dispersed in suitable film-forming vehicles.

Heretofore, metal flake pigments have been generally produced by mechanically milling or grinding fine pieces of metals or granulated or particulate metals by, for example, a stamp mill method, a dry ball mill method (Hametag method), a wet ball mill method (Hall method), an attritor method, a vibration ball mill method and the like. However, the conventional metal flakes obtained from these conventional methods generally have a specific surface area of approximately 20 $m^2/cm^3$, and; have such a particle size that approximately 80% of the particles pass through a screen having an open size of 20 microns and only approximately 40% of the particles pass through a screen having an open size of 5 microns, which are determined by a wet sieve analysis using a micromesh sieve (available from Buckbee-Mears Company). The maximum specific surface area of the conventional metal flakes is at most approximately 54 $m^2/cm^3$ and the minimum size thereof is such that at most approximately 95% of the flakes pass through a screen having an open size of 20 microns and at most approximately 75% of the flakes pass through a screen having an open size of 5 microns. Even in a case where the specific surface area of the metal flakes is forced to be increased by the conventional methods, the flakes or powders agglomerate with each other during the milling operation due to the increase in the activity of the metal powder particulate. Even if the agglomeration does not occur during the milling operation, the agglomeration rapidly occurs after the production. For this reason, as mentioned above, the maximum specific surface area and the minimum particle size, of the flakes produced by the conventional processes are limited.

Accordingly, an object of the present invention is to obviate the above mentioned disadvantages of the prior arts and to provide a metal flake pigment containing metal flakes, which have an extremely large specific surface area and which do not agglomerate with each other.

Another object of the present invention is to provide a metal flake pigment having improved properties, which facilitates the production operation of coating compositions containing the same and produces coatings having a good appearance.

A further object of the present invention is to provide a method for producing the above-mentioned metal flake pigment having improved properties.

Other objects and advantages of the present invention will be apparent from the description set forth hereinbelow.

In accordance with the present invention, there is provided a metal flake pigment comprising metal flakes between which no substantial aggregation is formed, said flakes having a specific surface area, determined by a BET method, of 65 through 250 $m^2/cm^3$ and having such a particle size distribution that at least 99.5% of the flakes pass through a screen having an opening size of 20 microns and at least 90% of the flakes pass through a screen having an opening size of 5 microns.

In accordance with the present invention, there is also provided a method for producing a metal flake pigment containing metal flakes having such a particle size distribution that at least 90% of the flakes pass through a screen having an opening size of 5 microns, which comprises wet milling small metal pieces or particulates in the presence of a milling aid in an amount sufficient to cover the surfaces of the metal flakes in a bi-molecule layer.

The present invention will be better understood from the description set forth below with reference to the accompanying drawing in which:

FIG. 1 is a graph illustrating a correlation between a 20° specular gloss value of the coating containing the present aluminum flakes and a specific surface area, based on a unit volume, of the aluminum flakes.

The metal flakes of the present invention include flakes of aluminum, copper, zinc and other metals and alloys having malleability. Examples of the other metals and alloys having malleability are nickel, magnesium, aluminum-copper alloy, aluminum-zinc alloy, aluminum-nickel alloy, aluminum-magnesium alloy and like. These metal flakes can be used alone or in any combination thereof. The most preferable metal flakes are aluminum flakes. The term "flake" used herein is used in a conventional sense and, generally speaking, includes small thin pieces which have a geometric diameter of approximately 5 through 50 microns and have a ratio of the thickness to the diameter of approximately 1/50 through 1/250. The metal flakes of the present invention have a smaller diameter and thinner thickness than the conventional metal flakes, but the ratio of the thickness to the diameter of the present metal flakes is similar to that of the conventional flakes. The metal flakes, especially when they are oriented or aligned in coatings, impart to the coatings excellent properties, such as, excellent specular gloss, as compared with metal powders having a spherical or particulate form.

The metal flakes of the present invention have a specific surface area, determined by a BET method, of 65 through 250 $m^2/cm^3$, more preferably, 120 through 250 $m^2/cm^3$. It is known that the specific surface area of flakes becomes large as the thickness thereof becomes thin, and, the surfaces of coatings in which the flakes are parallelly oriented becomes smooth as the thickness of the flakes becomes thin. This is clear from the correlation of the specific surface area of the flakes and 20° specular gloss illustrated in FIG. 1. As shown in FIG. 1, there is a break point, at a specific surface area of 250 $m^2/cm^3$, between the correlation curves of the present metal flakes (a) and the conventional flakes (b). The metal flakes of the present invention have a specular gloss of approximately 200% at a specific surface area of 120 $m^2/cm^3$ and the specular gloss increases with an increase in the specific surface area of the metal flakes. In the case where the specific surface area of the present metal flakes is 250 m$^2$/cm$^3$, the specular gloss of coatings containing the present metal flakes becomes similar to that of metal plated plates. In FIG. 1, a line (c) shows a level of the specular gloss of an aluminum plate. However, in the case where the specific surface area of metal flakes is more than 250 m$^2$/cm$^3$, the metallic appearance or sheen is lost. It is believed that this loss of metallic appearance is due to the fact that there is a limit to the amount the metal flakes can be thinned by the conventional methods, although they can be in the form of extra fine powder. It should be noted that the increase in the specific surface area (i.e. very thin flakes) improves the hiding power of coatings containing the thin flakes therein.

The metal flakes of the present invention do not contain any large particulates or flakes and have a particle size such that 99.5% or more, and, preferably, 99.8% or more, pass through a screen having an open size of 20 microns, and 90% or more and, preferably, 95% or more, pass through a screen having an open size of 5 microns, when these metal flakes are sieved according to a wet sieving method using a micromesh sieve (available from Buckbee-Mears Company).

The particle size distribution of the metal flakes has a large influence on the sharpness of coatings derived from coating compositions containing such metal flakes. In the case where metal flakes having a particle size such that less than 99.5% pass through a screen having an open size of 20 microns are used, the sharpness of the coatings derived from the coating composition containing such metal flakes is greatly decreased due to the presence of coarse flakes having a size of more than 20 microns. In the case where metal flakes having a particle size such that 99.5% or more pass through a screen having an open size of 20 microns and 90% or more pass through a screen having an open size of 5 microns are used, the sharpness of the coatings is greatly improved. Furthermore, in the case where metal flakes having a particle size such that 99.8% or more pass through a screen having an open size of 20 microns and 95% or more pass through a screen having an open size of 5 microns are used, the sharpness of the coatings is further improved.

In paint production processes, filtration steps are essential at the final step after pigments are dispersed. Especially, the filtration is preferably carried out by using a screen having a open size which is as fine as possible. Since the thickness of paint coatings is generally within the range of from approximately 10 to approximately 30 microns, particles or flakes having a size of more than this coating thickness remain, as a so-called "Seediness", in the coatings and form defective portions in the coatings. However, in conventional paint production processes, the filtration is generally limited to the use of a 20 mesh screen. Contrary to this, in the case where the metal flakes according to the present invention are used, the filtration using a screen having an extremely thinner open size than the conventional screen, e.g. a screen having an open size of 37 microns, can be used, as will be clear from the examples set forth hereinafter. Thus, the use of the present metal flakes is remarkably advantageous in the production of paints from a practical point of view. In addition, the dispersion stability of the metal flake pigments in the produced paints is good, so that the pigments do not easily settled or separate in the paints.

The metal flakes of the present invention having the above-mentioned particle size distribution and specific surface area do not cause any agglomeration. When agglomeration occurs with conventional metal flakes, the smoothness and sharpness of the coatings decrease. The degree of agglomeration can be evaluated by determining a water coverage according to a method set forth in "Aluminum Powder and Aluminum Paste for Paints", of DIN 55923. The determination results are expressed as a water coverage area per a unit volume. These values are converted, in terms of a specific weight, so that the values can be directly compared with each other between various metals. In the case where metal powders or flakes having a water coverage of less than 135,000 cm$^2$/cm$^3$ are used, the sharpness of the coatings containing the same is not high and the speculars gloss of the coatings in which such metal powders or flakes are oriented is low. However, the water coverage of the metal flakes of the invention is at least 135,000 cm$^2$/cm$^3$.

The metal flake pigments of the present invention can be used in the form of powders, pastes or slurries.

The metal flake pigments of the present invention can be prepared by, for example, the following wet ball milling method (a so-called Hall method). That is, fine metal pieces or particulates, milling aids such as higher fatty acids or the derivative thereof and petroleum solvents such as mineral spirits are placed, as starting materials, in a cylindrical drum made of steel, and containing many steel balls. The ball milling can be carried out at an appropriate rotation speed. The falling balls repeatedly impact against the metal pieces or particulates due to the rotation, whereby the metal pieces or particulates are divided and ground. The fatty acids or the derivatives thereof serve as a milling aid, and also, serve as a surface treatment agent for improving dispersibility and other properties of the pigments.

The milling aids used in the present invention include: for example, saturated higher fatty acids, such as lauric acid, myristic acid, palmitic acid, stearic acid, arachic acid, behenic acid, pelargonic acid, undecanoic acid and the like; unsaturated higher fatty acids, such as oleic acid, elaidic acid, erucic acid, linolic acid, ricinoleic acid and the like; higher fatty amines, such as stearyl amine, lauryl amine, myristyl amine, oleylamine and the like; higher fatty alcohols, such as stearyl alcohol, oleyl alcohol, lauryl alcohol, myristyl alcohol and the like; higher fatty amides, such as stearic acid amide, lauric acid amide, oleic acid amide and the like; the metal salts of higher fatty acids, such as aluminum stearate, aluminum oleate and the like. These milling aids can be used alone or any combination thereof. Fluorocarbon resins can also be used as a milling aid in the present invention. Among these milling aids, when the saturated higher fatty acids are used, metal flakes having a leafing value of 1% or more can be obtained.

In the present invention, the addition amount of the milling aids, the milling time and other milling conditions, such as the addition amount of the milling balls, are important. Since the specific weights of metals vary widely depending on kinds of metals to be milled, the lower limit of the addition amount of the milling aids of the present invention will vary depending on the kinds of metals. However, the addition amount of the milling aid of the present invention is larger than that of the milling aids conventionally used. Generally speaking, the addition amount of the milling aids in the present invention is at least 3.6 parts by weight based on 100 parts by weight of the starting metal. The maximum addition amount of the milling aids is generally approximately 120 parts by weight based on 100 parts by weight of the starting metal. In the case where the addition amount of the milling aids is more than 120 parts by weight based on 100 parts by weight of the starting metal, the technical effects obtained from the use of the milling aids are not further improved and, also, the removal of the milling aids, which is difficult, is unpreferably required after the milling operation. Furthermore, even if the milling aids are added to the milling system in an amount within the above-mentioned range, the desired effects to be obtained from the use of the milling aids are not necessarily obtained if the milling time is too short or if the milling aids are not uniformly coated or adhered over a surface of the metal. The milling operation is usually carried out between 10 and 50 hours. An important point is that the surfaces of the flakes after ball milling are covered with a bimolecule layer of the milling aid. If not, agglomeration of the flakes occurs and, therefore, metal flake pigments having the above-mentioned specific surface area and particle size distribution cannot be obtained.

In the final step of the milling operation, the ball mill is washed with an excess amount of spirits and the ball milled metal flakes are taken out from the ball mill in the form of a slurry. The coarse flakes are removed from the slurry by a wet type screen. Thus, a slurry containing metal flakes having the above-mentioned characteristics can be obtained. This slurry may be centrifuged to form a metal flake pigment in the form of paste. This paste may be further vacuum evaporated to form a metal flake pigment in the form of powder. Although one typical embodiment of the method of the production of the present metal flake pigments is explained hereinabove, it should be noted that the production method of the present invention is by no means limited to this method and that any conventional grinding or milling methods can be used in the production of the present metal flake pigments.

As mentioned hereinabove, in the case where the saturated higher fatty acids are used as a milling aid in the present invention, the metal flake pigments of the present invention having a leafing value of 1% or more can be obtained. It is known that, when metal flake pigments having such leafing value are mixed with suitable vehicles, metal plating-like coating appearance having excellent specular gloss can be obtained by parallelly aligning the flakes in the surface layer of the coating. Therefore, these metal flake pigments can be partially substituted for metal plating. However, conventional metal flake pigments have not been substituted for metal plating, since specular gloss similar to that of metal plating cannot be obtained. Contrary to this, when the metal flake pigments of the present invention are used, coatings having a very excellent specular gloss similar to that of metal plating can be readily obtained.

Although the metal flake pigments having a leafing value of 1% or more result in good specular gloss, the leafing value of the metal flake pigments is preferably 20% or more and is more preferably 65% or more. As the leafing value of the pigments increases, the maintenance of the leafing property of the coating composition containing the same increases when the coating composition is stored. This maintenance property is called "leafing stability". It is said that, the higher the leafing value, the better the leafing stability. For instance, when the metal flake pigments having a leafing value of 20% or more are diluted and allowed to stand for a long period of time, the leafing property, thereof can be maintained. Further, the metal flake pigments having a leafing value of 65% or more can be diluted in paints, without losing the leafing property thereof, for a long period of time.

As mentioned above, since the thickness of the metal flakes contained in the present metal flake pigments is extremely thin, as illustrated by their large specific surface area, and since there is no substantial amount of flakes having a size of more than 20 microns, as illustrated by their sieve passage amounts, the following advantages are obtained from the points of view of the production of coating compositions containing the present metal flake pigments and the properties of coatings derived from said coating composition.

(A) The filtration properties of the metal flake pigments are remarkably increased when the coating compositions containing the same are produced.

(B) The dispersion properties of the metal flake pigments in the coating compositions containing the same are remarkably improved.

(C) The hiding power of the coatings obtained from the coating composition containing the present metal flake pigments is remarkably improved.

(D) The sharpness of the coatings obtained from the coating compositions containing the present metal flake pigments in remarkably improved.

The above-mentioned features (A), (B), (C) and (D) can be obtained by the use of the present metal flake pigments having a specific surface area within the above-mentioned range and the above specified particle size distribution. In the case where the metal flakes of the present invention are parallelly aligned in a coating, the present metal flake pigment results in a coating having an excellent specular gloss, which cannot be obtained from the use of the conventional metal flake pigments.

The present invention will be further illustrated by, but is by no means limited to, the following examples, in which all percentages are expressed on a weight basis unless otherwise specified.

EXAMPLE 1 AND COMPARATIVE EXAMPLE 1

A mixture of 700 g of particulate aluminum powders having an absolute size constant d' of 60 microns, 30 g of stearic acid (special grade chemical) and 700 ml of mineral spirits (LAWS, SHELL CHEMICAL CO.) was placed, together with 35 kg of steel balls each having a diameter of 5 mm$\phi$, in a ball mill made of steel (volume: 25 liter, inner diameter: 300 mm$\phi$ and length: 350 mm) and, then, subjected to ball milling for 6 hours at 58 rpm. The milled mixture was taken out of the ball mill by using 2.8 liters of mineral spirit. Thus, a 20% aluminum flake slurry containing aluminum flakes in mineral spirits was obtained. The aluminum flakes thus obtained had a particle size distribution such that, according to a wet sieve analysis using a micromesh sieve, 92.0% of the flakes passed through a screen having an opening size of 20 microns and 52.5% of the flakes passed through a screen having an opening size of 5 microns. The specific surface area of the flakes per unit volume, determined by a BET method, was 21.0 $m^2/cm^3$. The leafing value of the flakes was 85% and the water coverage of the flakes was 69,000 $cm^2/cm^3$. The aluminum flake slurry thus obtained was named "Sample (1)".

Similarly, samples (2) through (8) were prepared in the same manner as described above, except that the milling conditions listed in Table 1 below were used.

TABLE 1

| | Milling Conditions | | | | | |
|---|---|---|---|---|---|---|
| | Amount of Starting Material | | | Ball Mill | | |
| Sample No. | Aluminum Powder (g) | Stearic Acid (g) | Mineral Spirit (ml) | Steel Ball (kg) | Rotation Speed (rpm) | Milling Time (hr) |
| (1)* | 700 | 30 | 700 | 34.5 | 58 | 6 |
| (2)* | 700 | 25 | 700 | 34.5 | 58 | 15 |
| (3) | 700 | 240 | 700 | 34.5 | 58 | 32 |
| (4) | 700 | 240 | 700 | 34.5 | 58 | 48 |
| (5) | 350 | 120 | 350 | 34.5 | 58 | 40 |
| (6) | 700 | 140 | 800 | 34.5 | 58 | 48 |
| (7) | 700 | 150 | 800 | 34.5 | 58 | 48 |
| (8)* | 700 | 25 | 700 | 34.5 | 58 | 48 |

*Comparative Example

The aluminum flake pigment samples (1) through (8) thus obtained were evaluated as follows, and the results are shown in Table 4 below.

(a) Water Coverage Test

The water coverage area of each pigment sample was determined according to a method of DIN 55923.

(b) Specific Surface Area Test

The specific surface area per unit volume of each pigment sample was determined by using a Shimazu Micromeritics Surface Area Automatic Analyzer Type 2200 (made by Shimazu Seisaku Sho Co., Ltd.).

(c) Leafing Value Test

The leafing value of each pigment sample was determined according to a method of DIN 55923.

(d) Thickness of Stearic Acid layer (Molecule Layer Number)

The thickness of the adsorped layer of stearic acid on the surface of the aluminum flakes was determined as follows.

Each aluminum flake pigment sample in slurry was first centrifuged to separate the mineral spirits and the aluminum flake pigment. The amount B (g) of stearic acid contained in the separated mineral spirits was determined in an absolute calibration curve method by a gas chromatography. The amount C (g) of the stearic acid adsorbed onto the aluminum flake pigment was obtained from the following equation.

$$C = A - B$$

wherein A is the amount (g) of the stearic acid first charged.

On the other hand, the separated aluminum flakes obtained above were washed with an excess amount of acetone and, then, centrifuged to form a paste. This paste was vacuum dried at an ordinary temperature and, then, triturated with a spatula to form powders. These powders were treated at a temperature of 400° C., for one hour, under a nitrogen gas stream. After that, a predetermined amount of the powders thus treated was sampled and a specific surface area per unit volume was determined according to a BET method, by a Micromeritics Specific Surface Area Automatic Analyzer Type 2200 (made by Shimazu Seisaku Sho Co., Ltd.). From the determined specific surface area $S_A$ m²/cm³, the thickness D of the adsorbed stearic acid layer was obtained from the following equation.

$$D = \frac{C^{*1} \times 20.5 \times 10^{-20*2} \times 6.02 \times 10^{23*3} \times 2.7^{*4}}{S_A^{*5} \times W^{*6} \times 284^{*7}}$$

*1 Amount (g) of stearic acid adsorbed onto the surface of the aluminum flakes.
*2 Occupied area of one mole of stearic acid (m²) (Kagaku Binran, 1966)
*3 Avogadro's number
*4 Specific weight of aluminum
*5 Specific surface area of aluminum flake pigment
*6 Amount (g) of charged aluminum powder
*7 Molecular weight of stearic acid (e) Specular Gloss Test Each coating composition having a formulation I of Table 2 below was first spray coated on a tin-plate at a thickness of approximately 20 microns (dry) and, thereover, each coating composition having a formulation II of Table 2 was spray coated at a thickness of approximately 5 microns (dry). After that, the coatings were baked at a temperature for 30 minutes. The 20° specular gloss of the coated plate was determined according to a method of JIS (Japanese Industrial Standard) Z-8741.

TABLE 2

| Formulation I | | Formulation II | |
|---|---|---|---|
| Acrylic Resin[1] | 640 g | Aluminum Flake Pigment | 5 g[3] |
| Melamine Resin[2] | 160 g | Formulation I | 3 g |
| Xylene | 200 g | Xylene | 92 g |
| Total | 1000 g | Total | 100 g |

[1] Acrydic 44-179 (Dainippon Ink Co., Ltd.)
[2] Super Beckamin J-820 (Dainippon Ink Co., Ltd.)
[3] In terms of Aluminum Metal (f) Sharpness Test Each coated plate was visually inspected, when the coated plate was irradiated by a fluorescent tube, and the sharpness of each coated plate was evaluated by the following criteria.

+ + + . . . Extremely Excellent
+ + . . . Excellent
+ . . . Good
− . . . Fair
− − . . . Bad (g) Filtration Property Test Each aluminum flake pigment sample was incorporated into a coating composition having the compositions listed in Table 3 below. The coating composition thus prepared was examined to determine the filtration property by filtering the coating composition through a filtering apparatus provided with a 325 mesh (Tyler) nylon filter cloth having a diameter of 35 mmφ. The time required for the composition to pass through the filter was measured.

TABLE 3

| Composition | g |
|---|---|
| Acrylic No. 2000[1] | 74.0 |
| Acrylic Thinner[2] | 70.0 |
| Aluminum Flake Pigment | 1.3[3] |
| Total | 145.3 |
| Viscosity FC #4 | 16 sec. (20° C.) |

[1] Acryl Lacquer (Kansai Paint Co., Ltd.)
[2] Thinner for Acryl Lacquer (Kansai Paint Co., Ltd.)
[3] In terms of Aluminum Metal (h) Sedimentation Test Each coating composition prepared in the filtration test was placed in a 50 ml color comparison tube having a diameter of 20 mmφ and was allowed to stand for 2 weeks at an ambient temperature. The sedimentation degree of the pigment was visually inspected.

TABLE 4

| Sample No. | Wet Sieve Test by Using Micromesh Sieve | | Water Coverage $\times 10^3$ ($cm^2/cm^3$) | Specific Surface Area per Unit Volume by BET Method ($m^2/cm^3$) | Thickness of Adsorbed Stearic Acid Layer (Molecular number) | Leafing Value (%) | 20° Specular Gloss (%) | Sharpness of image | Filtration Time through 325 mesh Screen (sec.) | Sedimentation |
|---|---|---|---|---|---|---|---|---|---|---|
| | Passage % of 5 microns Screen | Passage % of 20 microns Screen | | | | | | | | |
| (1)* | 52.5 | 92.0 | 69 | 21 | 2.1 | 85 | 30 | — — | ∞ (Do not pass through) | Fully Settled |
| (2)* | 74.3 | 97.0 | 115 | 55 | 0.76 | 0 | 35 | — — | ∞ (Do not pass through) | Fully Settled |
| (3) | 90.1 | 99.5 | 146 | 69 | 2.5 | 65 | 101 | + | 105 | Good |
| (4) | 95.5 | 99.8 | 233 | 110 | 2.1 | 60 | 216 | ++ | 60 | " |
| (5) | 98.0 | 99.9 | 350 | 170 | 2.3 | 70 | 435 | +++ | 45 | " |
| (6) | 90.5 | 99.5 | 205 | 106 | 2.0 | 2 | 168 | ++ | 90 | " |
| (7) | 93.0 | 99.7 | 230 | 115 | 2.1 | 55 | 200 | ++ | 74 | " |
| (8)* | 60.3 | 89.3 | 40 | 103 | 0.41 | 0 | 39 | — — | | Fully Settled |

*Comparative Example

As is clear from the results shown in Table 4 and FIG. 1, the samples (3), (4), (5), (6) and (7), of the present invention were extremely superior to the comparative samples (1), (2) and (8) with respect to the specular gloss, sharpness of image, filtration property and sedimentation property. The molecule number thickness of the stearic acid layer of the present samples (3), (4), (5), (6) and (7) were 2 or more, whereas the molecule number thickness of the stearic acid layer of the comparative sample (8) was 0.41, so that the resultant aluminum flakes were likely to agglomerate with each other and the water coverage thereof was very small.

EXAMPLE 2 AND COMPARATIVE EXAMPLE 2

A mixture of 150 g of particulate aluminum powders having an absolute size constant d' of 60 microns, 30 g of oleic acid (first class grade chemical) and 200 ml of mineral spirits (LAWS, SHELL CHEMICAL CO.) was placed, together with 10 kg of steel balls each having a diameter of 5 mm$\phi$, in an attritor having a tank volume of 4.9 liters (Type MA-ISD manufactured by MITSUI MIIKE SEISAKUSHO CO.) and, then, a milling operation was carried out at a rotation speed of 200 rpm for 24 hours. The milled mixture was taken out of the tank by using 0.8 liters of mineral spirits. Thus, a 15.8% aluminum flake slurry containing extra fine aluminum flakes in mineral spirits was obtained. The aluminum flakes thus obtained had such a particle size distribution that, according to a wet sieve analysis using a micromesh sieve, 99.8% of the flakes passed through a screen having an opening size of 20 microns and 98.0% of the flakes passed through a screen having an opening size of 5 microns. The specific surface area of the flakes, determined by a BET method, was 165 m$^2$/cm$^2$, the water coverage was 353,000 cm$^2$/cm$^3$ and the leafing value was 0%. This aluminum flake slurry was named a sample (9).

This sample (9) and a commercially available aluminum flake pigment 1880YL (manufactured from TOYO ALUMINUM CO.) were compared in a manner as described in Example 1. The results are shown in Table 5 below.

The hiding power was determined as follows.

Each coating composition containing the sample (9) or the pigment 1880YL was prepared according to the formulation as described in Table 3 above. Each coating composition was spray coated on a photographic paper (Fujibromide F #4). This photographic paper was previously coated, so that a checkered black and white pattern having each width of black and white pattern of 40 mm and having a brightness of 80 or more in the white portion and 5 or less in the black portion was formed on the paper. The coating composition was spray coated on the paper, so that the thickness of the coatings was changed at a distance of 40 mm. After drying, the coated photographic paper was visually observed. The hiding power was represented by the thickness of the coating where the boundary line of black and white could not be observed.

TABLE 5

| | Wet Sieve Test by Micromesh Screen | | Specific Surface Area by BET Method ($m^2/cm^3$) | Leafing Value (%) | Filtration Time through 325 mesh Screen (sec.) | Hiding Thickness of Coating (micron) | Sedimentation of Pigment |
|---|---|---|---|---|---|---|---|
| | Passage % of 5 microns Screen | Passage % of 20 microns (Screen) | | | | | |
| Sample (9) | 98.0 | 99.8 | 170 | 0 | 40 | 9 | Good |
| 1880YL | 55.0 | 95.7 | 45 | 0 | ∞ (Do not pass through) | 25 | Fully Settled |

As is clear from the results shown in Table 5 above, the sample (9) according to the present invention had the extremely excellent pigment properties. There are marked difference in the pigment properties between sample (9) and 1880YL (1880YL is one of the most fine pigment among the commercially available aluminum pigments).

EXAMPLE 3

A mixture of 200 g of particulate zinc powder having an absolute size constant d' of 45 microns, 30 g of Oleic Acid (first class grade chemical) and 200 ml of mineral spirits (LAWS, SHELL CHEMICAL CO.) was placed, together with 15 kg of steel balls each having a diameter of 5 mmφ, in an attritor having a tank volume of 4.9 liters (Type MA-ISD manufactured by MITSUI MIIKE SEISAKUSHO CO.) and, then, a milling operation was carried out at a rotation speed of 200 rpm for 16 hours. The milled mixture thus obtained was taken out of the tank by using 0.8 liters of mineral spirits. Thus, a zinc flake slurry containing fine zinc flakes in mineral spirits was obtained. The zinc flakes thus obtained had such a particle size distribution that, according to a wet sieve analysis using a micromesh sieve, 99.6% of the flakes passed through a screen having an opening size of 20 microns and 93.2% of the flakes passed through a screen having an opening size of 5 microns. The specific surface area of the flakes, determined by a BET method, was 108 $m^2/cm^2$, the water coverage was 210,000 $cm^2/cm^3$ and the leafing value was 0%.

EXAMPLE 4

A mixture of 200 g of particulate copper powders having an absolute size constant d' of 50 microns, 30 g of oleic acid (first class grade chemical) and 200 ml of mineral spirits (LAWS, SHELL CHEMICAL CO.) was placed, together with 15 kg of steel balls each having a diameter of 5 mmφ, in an attritor having a tank volume of 4.9 liters (Type MA-ISD manufactured by MITSUI MIIKE SEISAKUSHO CO.) and, then, milling operation was carried out at a rotation speed of 200 rpm for 32 hours. The milled mixture was taken out of the tank by using 0.8 liters of mineral spirits. Thus, a copper flake slurry containing copper flakes in mineral spirits was obtained. The copper flakes thus obtained had such a particle size distribution that, according to a wet sieve analysis using a micromesh sieve, 99.6% of the flakes passed through a screen having an opening size of 20 microns and 92.0% of the flakes passed through a screen having an opening size of 5 microns. The specific surface area of the flakes, determined by a BET method, was 95 $m^2/cm^2$, the water coverage was 198,000 $cm^2/cm^3$ and the leafing value was 0%.

EXAMPLE 5

A mixture of 150 g of particulate aluminum powders having an absolute size constant d' of 60 microns, 57 g of stearic acid (special grade chemical) and 200 ml of mineral spirits (LAWS, SHELL CHEMICAL CO.) was placed, together with 10 kg of steel balls each having a diameter of 5 mmφ, in an attritor having a tank volume of 4.9 liters (Type TA-ISD manufactured by MITSUI MIIKE SEISAKUSHO CO.) and, then, milling operation was carried out at a rotation speed of 200 rpm for 24 hours. The milled mixture was taken out of the tank by using 0.8 liters of mineral spirits. Thus, a 15.8% aluminum flake slurry containing aluminum flakes in mineral spirits was obtained. The aluminum flakes thus obtained had such a particle size distribution that, according to a wet sieve analysis using a micromesh sieve, 99.8% of the flakes passed through a screen having an opening size of 20 microns and 98.0% of the flakes passed through a screen having an opening size of 5 microns. The specific surface area of the flakes, determined by a BET method, was 170 $m^2/cm^3$, the water coverage was 340,000 $cm^2/cm^3$ and the leafing value was 70%. This aluminum flake slurry was named a sample (10).

This sample (10) and commercially available aluminum flake pigments were compared in a manner as described in Example 1. The results are shown in Table 6 below.

TABLE 6

| | Wet Sieve Test by Micromesh Screen | | Specific Surface Area by BET Method ($m^2/cm^3$) | Leafing Value (%) | 20° Specular Gloss (%) |
| --- | --- | --- | --- | --- | --- |
| | Passage % of 5 micron Screen | Passage % of 20 micron Screen | | | |
| Sample (10) | 98.0 | 99.8 | 170 | 70 | 460 |
| 15HK[1] | 65.0 | 95.0 | 48.6 | 80 | 39 |
| 0215M[2] | 73.5 | 97.0 | 54.0 | 85 | 42 |

[1]Aluminum flake pigment manufactured by Eckart Werke. (Comparative)
[2]Aluminum flake pigment manufactured by Toyo Aluminum Co. (Comparative)

As is clear from the results shown in Table 6 above, the specular gloss of the sample (10) of the present invention was markedly higher than that of the commercially available pigments which are very fine among the commercially available metal flake pigments.

EXAMPLE 6

A mixture of 200 g of particulate zinc powders having an absolute size constant d' of 45 microns, 30 g of stearic acid (special grade chemical) and 200 ml of mineral spirits (LAWS, SHELL CHEMICAL CO.) was placed, together with 15 kg of steel balls each having a diameter of 5 mmφ, in an attritor having a tank volume of 4.9 liters (Type MA-ISD manufactured by MITSUI MIIKE SEISAKUSHO CO.) and, then, milling operation was carried out at a rotation speed of 200 rpm for 16 hours. The milled mixture was taken out of the tank by using 0.8 liters of mineral spirits. Thus, a zinc flake slurry containing zinc flakes in mineral spirits was obtained. The zinc flakes thus obtained had such a particle size distribution that, according to a wet sieve analysis using a micromesh sieve, 99.6% of the flakes passed through a screen having an opening size of 20 microns and 93.2% of the flakes passed through a screen having an opening size of 5 microns. The specific surface area of the flakes, determined by a BET method, was 108 $m^2/cm^3$, the water coverage was 210,000 $cm^2/cm^3$ and the leafing value was 30%.

EXAMPLE 7

A mixture of 200 g of particulate copper powders having an absolute size constant d' of 50 microns, 30 g of stearic acid (special grade chemical) and 200 ml of mineral spirits (LAWS, SHELL CHEMICAL CO.) was placed, together with 15 kg of steel balls each having a diameter of 5 mmφ, in an attritor having a tank volume of 4.9 liters (Type MA-ISD manufactured by MITSUI MIIKE SEISAKUSHO CO.) and, then, milling operation was carried out at a rotation speed of 200 rpm for 32 hours. The milled mixture was taken out of the tank by using 0.8 liters of mineral spirits. Thus, a copper flake slurry containing copper flakes in mineral spirits was obtained. The copper flakes thus obtained had such a particle size distribution that, according to a wet sieve analysis using a micromesh sieve, 99.6% of the flakes passed through a screen having an opening size of 20 microns and 92.0% of the flakes passed through a screen having an opening size of 5 microns. The specific surface area of the flakes, determined by a BET method, was 95 $m^2/cm^3$, the water coverage was 191,000 $cm^2/cm^3$ and the leafing value was 35%.

EXAMPLE 8

A mixture of 650 g of particulate zinc powder having an absolute size constant d' of 30 microns, 100 g of particulate aluminum powders having an absolute size constant d' of 35 microns, 200 g of stearic acid (special grade chemical) and 700 ml of mineral spirits (LAWS, SHELL CHEMICAL CO.) was placed, together with 25 kg of steel ball each having a diameter of 5 mm$\phi$, in a ball mill made of steel (volume: 25 liter, inner diameter: 300 mm$\phi$ and length: 350 mm) and, then, subjected to ball milling for 40 hours at a rotation speed of 58 rpm. The milled mixture was taken out of the ball mill by using 2.8 liters of mineral spirit. Thus, a zinc-aluminum composite flake slurry containing the composite flakes in mineral spirits was obtained. The flakes thus obtained had a particle size distribution such that, according to a wet sieve analysis using a micromesh sieve, 99.5% of the flakes passed through a screen having an opening size of 20 microns and 92.5% of the flakes passed through a screen having an opening size of 5 microns. The specific surface area of the flakes per unit volume, determined by a BET method, was 100 m$^2$/cm$^3$. The leafing value of the flakes was 50% and the water coverage of the flakes was 185,000 cm$^2$/cm$^3$.

EXAMPLE 9

A mixture of 700 g of particulate zinc-aluminum alloy (Zn/Al=3/1) powders having an absolute size constant d' of 50 microns, 200 g of stearic acid (special grade chemical) and 700 ml of mineral spirits (LAWS, SHELL CHEMICAL CO.) was placed, together with 35 kg of steel balls each having a diameter of 5 mm$\phi$, in a ball mill made of steel (volume: 25 liter, inner diameter: 300 mm$\phi$ and length: 350 mm) and, then, subjected to ball milling for 40 hours at 58 rpm. The milled mixture was taken out of the ball mill by using 2.8 liters of mineral spirit. Thus, a zinc-aluminum alloy flake slurry containing the alloy flakes in mineral spirits was obtained. The flakes thus obtained had a particle size distribution such that, according to a wet sieve analysis using a micromesh sieve, 99.6% of the flakes passed through a screen having an opening size of 20 microns and 94.0% of the flakes passed through a screen having an opening size of 5 microns. The specific surface area of the flakes per unit volume, determined by a BET method, was 95 m$^2$/cm$^3$. The leafing value of the flakes was 55% and the water coverage of the flakes was 235,000 cm$^2$/cm$^3$.

EXAMPLE 10

A mixture of 850 g of particulate brass powders having an absolute size constant d' of 50 microns, 200 g of stearic acid (special grade chemical) and 700 ml of mineral spirits (LAWS, SHELL CHEMICAL CO.) was placed, together with 35 kg of steel balls each having a diameter of 5 mm$\phi$, in a ball mill made of steel (volume: 25 liter, inner diameter: 300 mm$\phi$ and length: 350 mm) and, then, subjected to ball milling for 40 hours at 58 rpm. The milled mixture was taken out of the ball mill by using 2.8 liters of mineral spirit. Thus, a brass flake slurry containing brass flakes in mineral spirits was obtained. The brass flakes thus obtained had a particle size distribution such that, according to a wet sieve analysis using a micromesh sieve, 99.6% of the flakes passed through a screen having an opening size of 20 microns and 94.0% of the flakes passed through a screen having an opening size of 5 microns. The specific surface area of the flakes per unit volume, determined by a BET method, was 120 m$^2$/cm$^3$. The leafing value of the flakes was 40%.

We claim:

1. A metal flake pigment comprising metal flakes between which no substantial aggregation is formed, said flakes (i) having a specific surface area, determined by a BET method, of 65 through 250 m$^2$/cm$^3$, (ii) having such a particle size distribution that at least 99.5% of the flakes pass through a screen having an opening size of 20 microns and at least 90% of the flakes pass through a screen having an opening size of 5 microns (iii) having a leafing value, determined by a DIN 55923 method, of at least 1%, (iv) having on the surfaces thereof a bi-molecule layer of an acid selected from the group consisting of lauric acid, myristic acid, palmitic acid, stearic acid, arachic acid, behenic acid, pelargonic acid and undecanoic acid and (v) having a water coverage, determined by a DIN 55923 method, of at least 135,000 cm$^2$/cm$^3$.

2. The metal flake pigment of claim 1, wherein the leafing value of the metal flakes is at least 20%.

3. The metal flake pigment of claim 1, wherein the leafing value of the metal flakes is at least 65%.

4. The metal flake pigment of any one of claims 1, 2 or 3, wherein said pigment is in the form of slurry or paste.

5. A method for producing a metal flake pigment comprising metal flakes (i) having a specific surface area, determined by a BET method, of 65 through 250 m$^2$/cm$^3$, (ii) having such a particle size distribution that at least 99.5% of the flakes pass through a screen having an opening size of 20 microns and at least 90% of the flakes pass through a screen having an opening size of 5 microns and (iii) having a leafing value, determined by a DIN 55923 method, of at least 1%, which comprises wet milling small metal pieces or particulates for between about 10 and 50 hours in the presence of a milling aid, selected from the group consisting of lauric acid, myristic acid, palmitic acid, stearic acid, arachic acid, behenic acid, pelargonic acid and undecanoic acid, in an amount sufficient to cover the surfaces of the metal flakes in a bi-molecule layer.

6. The method of claim 5, wherein the amount of the milling aid is within the range of from 3.6 to 120 parts by weight, based on 100 parts by weight of the starting metal.

* * * * *